US009498058B2

(12) United States Patent
Espinosa et al.

(10) Patent No.: US 9,498,058 B2
(45) Date of Patent: Nov. 22, 2016

(54) CLOSET STORAGE ASSEMBLIES, CONNECTORS, BRACKETS AND SYSTEMS

(71) Applicant: Clairson, Inc., Newark, DE (US)

(72) Inventors: Edward S. Espinosa Espinosa, Ocala, FL (US); Stephen E. Watkins, Morriston, FL (US); Ernie Torres, Gainesville, FL (US); Emily C. Burgoyne, Ocala, FL (US)

(73) Assignee: Clairson, Inc., Newark, DE (US)

( * ) Notice: Subject to any disclaimer, the term of this patent is extended or adjusted under 35 U.S.C. 154(b) by 213 days.

(21) Appl. No.: 14/592,268

(22) Filed: Jan. 8, 2015

(65) Prior Publication Data

US 2016/0198849 A1   Jul. 14, 2016

(51) Int. Cl.
| | | |
|---|---|---|
| *A47B 47/00* | (2006.01) | |
| *A47B 61/00* | (2006.01) | |
| *F16B 12/40* | (2006.01) | |
| *F16B 12/46* | (2006.01) | |
| *F16B 12/50* | (2006.01) | |

(52) U.S. Cl.
CPC ............. *A47B 61/003* (2013.01); *F16B 12/40* (2013.01); *F16B 12/46* (2013.01); *F16B 12/50* (2013.01)

(58) Field of Classification Search
CPC  A47B 61/003; A47B 47/027; A47B 47/028; A47G 25/0664; A47G 25/0685; A47G 25/0692; A47F 5/01; A47F 5/08; A47F 5/14; A47F 5/0006; A47F 7/19; A47F 7/22; A47F 7/24; F16B 12/40; F16B 2012/403
USPC ....................................................... 211/182
See application file for complete search history.

(56) References Cited

U.S. PATENT DOCUMENTS

| | | | | |
|---|---|---|---|---|
| 692,529 | A * | 2/1902 | Knittle ..................... | B60M 1/16 |
| | | | | 174/160 |
| 833,746 | A | 10/1906 | Lyle | |
| 986,725 | A * | 3/1911 | Kuntzendorf .......... | A47B 67/04 |
| | | | | 211/182 |
| 1,096,282 | A * | 5/1914 | Boehm ................ | A47B 61/003 |
| | | | | 248/251 |
| 1,347,808 | A | 7/1920 | Franklin | |
| 1,963,981 | A | 6/1934 | Garrett | |
| 2,839,320 | A * | 6/1958 | Hill ........................... | E04G 7/02 |
| | | | | 135/909 |
| 2,998,142 | A * | 8/1961 | Reed ........................ | A47F 7/24 |
| | | | | 211/113 |

(Continued)

FOREIGN PATENT DOCUMENTS

| | | | | | |
|---|---|---|---|---|---|
| EP | 2204520 | * | 7/2010 | ............. | A47G 25/06 |
| FR | 2959921 | * | 11/2011 | ............. | A47B 61/02 |

(Continued)

*Primary Examiner* — Michael Safavi
(74) *Attorney, Agent, or Firm* — Harness, Dickey & Pierce, P.L.C.

(57) ABSTRACT

Exemplary embodiments are disclosed of closet storage assemblies, connectors, brackets, and/or systems. In an exemplary embodiment, a closet storage assembly generally includes multiple horizontal shelves, vertical rods, and a horizontal rod. A T-connector is configured to be coupled between an end portion of a horizontal rod and a portion of one of the vertical rods. The T-connector includes a flexible tab to secure the horizontal rod. An elbow connector is configured to be coupled between another end portion of the horizontal rod and a portion of another vertical rod. The elbow connector includes a flexible tab to secure the horizontal rod. A bracket is configured to be coupled to a vertical rod at a top end. The bracket includes an opening configured to engage a wire hang rod and/or a pole hang rod, a living hinge, and a locking pin to secure the vertical rod.

12 Claims, 14 Drawing Sheets

(56) References Cited

U.S. PATENT DOCUMENTS

| | | | |
|---|---|---|---|
| 3,021,159 A | 2/1962 | Back | |
| 3,081,882 A * | 3/1963 | Magnuson | A47G 25/0692 |
| | | | 211/119.003 |
| 3,144,946 A * | 8/1964 | Ellis | A47F 7/24 |
| | | | 211/182 |
| 3,342,344 A * | 9/1967 | Magnuson | A47G 25/0692 |
| | | | 16/87.4 R |
| 3,515,319 A * | 6/1970 | Furtak | A47G 25/0692 |
| | | | 223/85 |
| D218,204 S | 7/1970 | Schier et al. | |
| 3,765,634 A * | 10/1973 | Stempel | A47B 55/02 |
| | | | 248/250 |
| 3,820,909 A | 6/1974 | Schindler et al. | |
| 3,853,074 A * | 12/1974 | Madey | A47F 5/106 |
| | | | 108/101 |
| 4,099,815 A * | 7/1978 | Cox | A47B 88/0014 |
| | | | 312/111 |
| 4,209,099 A * | 6/1980 | Wickes | F16B 12/40 |
| | | | 211/105.3 |
| 4,762,238 A * | 8/1988 | Blanchard | A47G 25/32 |
| | | | 211/123 |
| 4,864,795 A | 9/1989 | Burg | |
| 5,027,962 A | 7/1991 | Maccarrone | |
| 5,257,794 A * | 11/1993 | Nakamura | B62B 3/00 |
| | | | 211/182 |
| D347,377 S | 5/1994 | Nakamura et al. | |
| D355,590 S | 2/1995 | Kuwata | |
| 5,492,295 A * | 2/1996 | Remmers | A47F 5/14 |
| | | | 211/105.1 |
| 5,503,312 A * | 4/1996 | Kassner | F16M 13/00 |
| | | | 211/182 |
| D371,431 S | 7/1996 | Streit | |
| D374,607 S | 10/1996 | Shoda | |
| D397,210 S | 8/1998 | Evans | |
| D418,396 S | 1/2000 | Hirano et al. | |
| 6,565,279 B1 | 5/2003 | Skovronski et al. | |
| D480,298 S | 10/2003 | Skovronski et al. | |
| D482,956 S | 12/2003 | Pyron | |
| 7,062,836 B1 | 6/2006 | Sorgi | |
| 2004/0101354 A1 | 5/2004 | Nakahori et al. | |
| 2008/0135509 A1* | 6/2008 | Jackson | A47B 57/54 |
| | | | 211/123 |
| 2010/0092236 A1 | 4/2010 | Kang | |
| 2012/0087719 A1 | 4/2012 | Rixen et al. | |
| 2012/0223518 A1 | 9/2012 | Yoshino | |

FOREIGN PATENT DOCUMENTS

| | | | | |
|---|---|---|---|---|
| WO | WO 2004/093603 | * | 11/2004 | A47B 47/00 |
| WO | WO 2009/057200 | * | 5/2009 | A47G 29/00 |

* cited by examiner

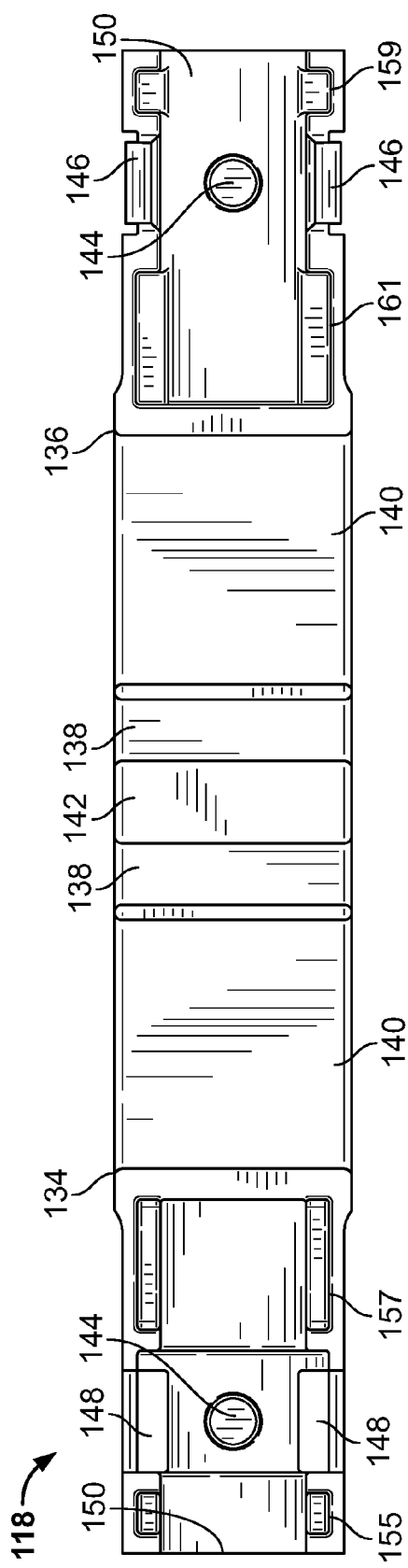
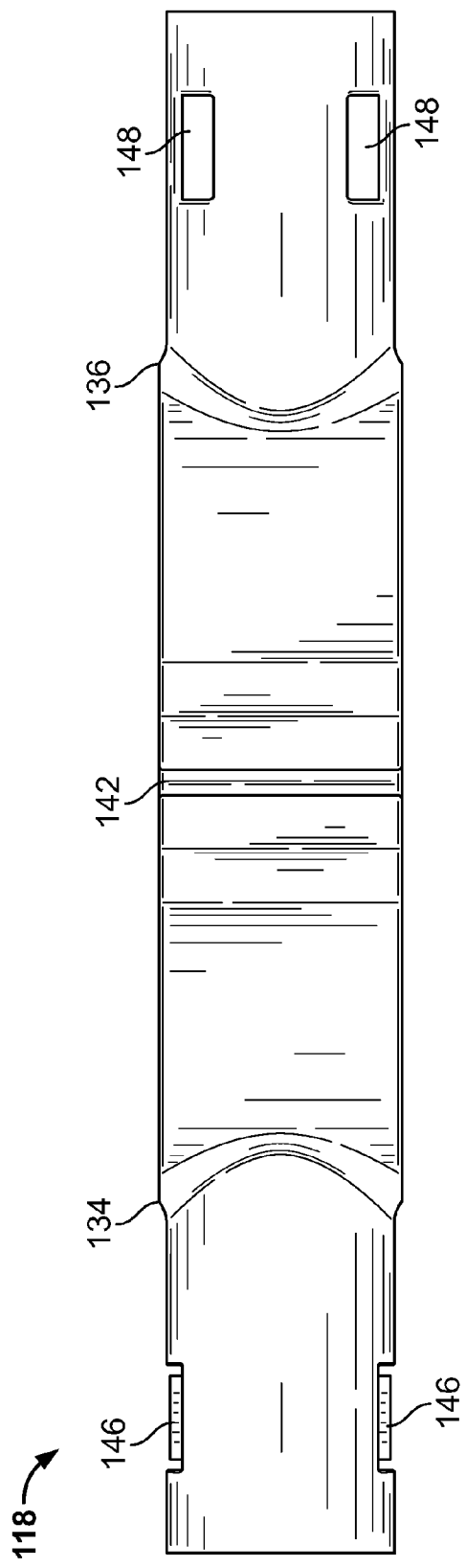
FIG. 18
FIG. 19

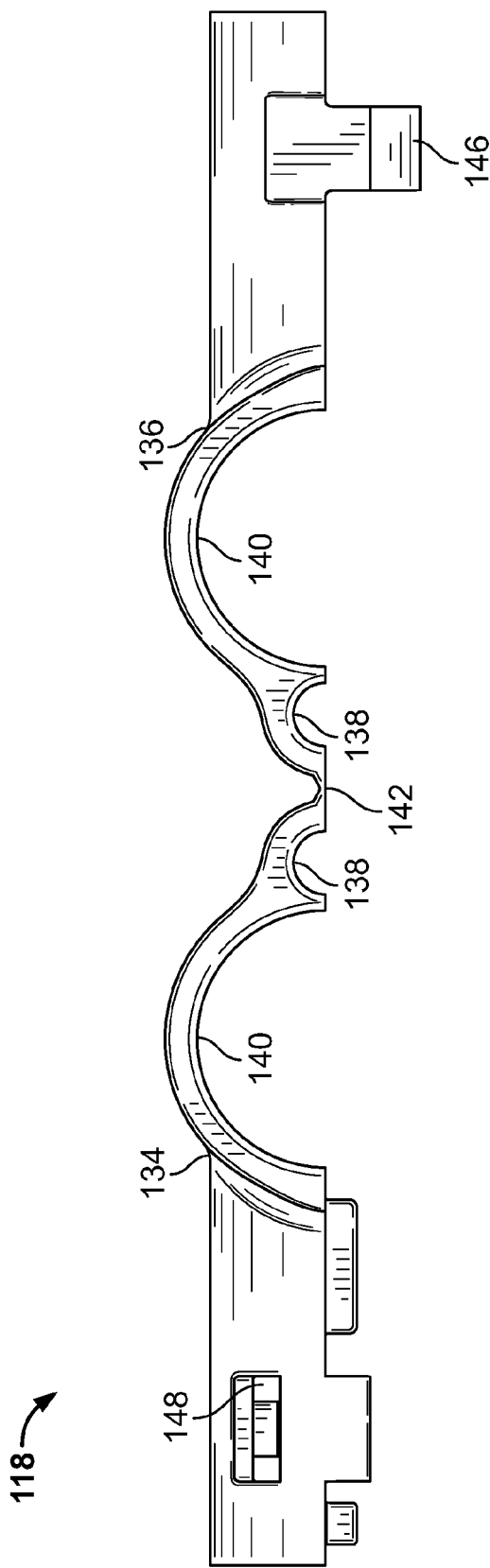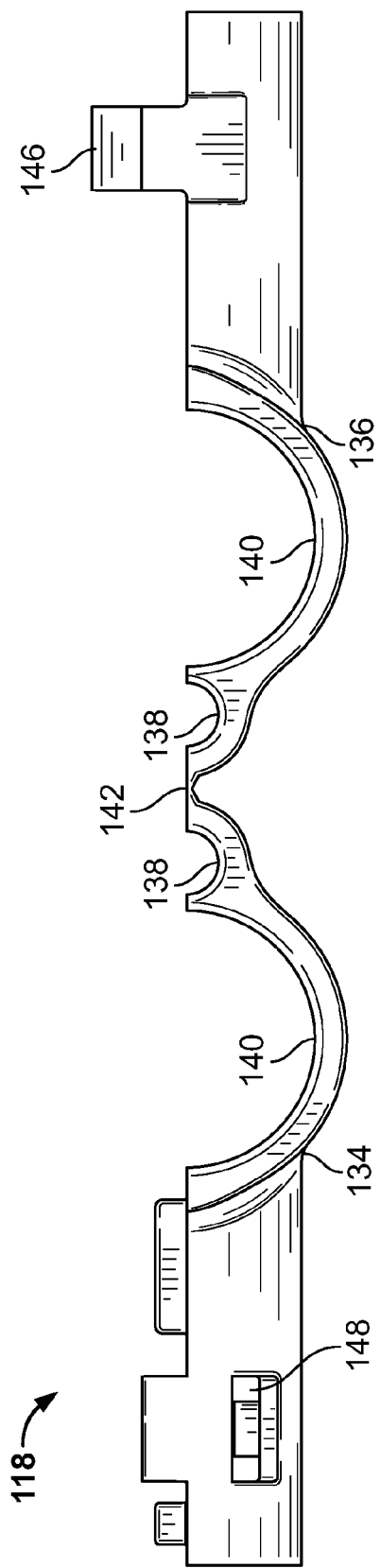
FIG. 22
FIG. 23

CLOSET STORAGE ASSEMBLIES, CONNECTORS, BRACKETS AND SYSTEMS

FIELD

The present disclosure generally relates to closet storage assemblies and systems, including connectors and brackets for use in the assemblies and systems.

BACKGROUND

This section provides background information related to the present disclosure which is not necessarily prior art.

Clothes, shoes, accessories, jewelry, etc. are generally stored in closets. Shelves, rods, racks, drawers, etc. may be used to store different types of items in different locations for ease of access by a wearer. For example, shoes and folded clothing may generally be stored on shelves or in drawers, while hanging clothes may be hung from rods or racks.

SUMMARY

This section provides a general summary of the disclosure, and is not a comprehensive disclosure of its full scope or all of its features.

According to various aspects, exemplary embodiments are provided of closet storage assemblies, connectors, brackets, and/or systems. In an exemplary embodiment, a closet storage assembly generally includes multiple horizontal shelves and first, second, and third vertical rods configured to be coupled to the multiple horizontal shelves for supporting the horizontal shelves. The assembly also includes a horizontal rod and a T-connector configured to be coupled between a first end portion of the horizontal rod and a portion of the first vertical rod located between the first vertical rod's top and bottom ends. The T-connector includes an opening and a flexible tab adjacent the opening to secure the first end portion of the horizontal rod in the opening of the T-connector. The assembly further includes an elbow connector configured to be coupled between a second end portion of the horizontal rod and a bottom end portion of the third vertical rod. The elbow connector includes an opening and a flexible tab adjacent the opening to secure the second end portion of the horizontal rod in the opening of the elbow connector. At least three upper brackets are each configured to be coupled to a different one of the vertical rods at a top end portion thereof. Each upper bracket includes an opening configured to engage a wire hang rod and/or a pole hang rod, a living hinge, and a locking pin. The living hinge is configured to allow the upper bracket to move from an open position to a closed position. The locking pin is configured to secure the top end portion of the vertical rod in the upper bracket while the upper bracket is in the closed position.

According to another aspect, a connector for a closet storage assembly generally includes an opening configured to receive an end portion of a horizontal rod. The connector also includes a vertical rod coupler substantially perpendicular to the first opening. The vertical rod coupler is configured to couple an end portion of a vertical rod. A flexible tab is adjacent the first opening. The flexible tab is configured to engage the end portion of the horizontal rod to secure the end portion of the horizontal rod in the first opening of the connector According to another aspect, a bracket for a closet storage assembly includes first and second bracket portions. The first bracket portion includes or defines a first wire hang rod recess and a first pole hang rod recess. The second bracket portion includes or defines a second wire hang rod recess and a second pole hang rod recess. The bracket also includes a living hinge between the first and second bracket portions. The living hinge is configured to allow the first bracket portion and the second bracket portion to close together such that the first and second wire hang rod recesses align together to form a wire hang rod opening configured to engage a wire hang rod, and such that the first and second pole hang rod recesses align together to form a pole hang rod opening configured to engage a pole hang rod. The first bracket portion also includes a locking pin.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 17-23 illustrate several views of an example upper bracket, which may be used in the closet storage assembly shown in FIG. 1.

Corresponding reference numerals indicate corresponding parts throughout the several views of the drawings.

DETAILED DESCRIPTION

Example embodiments will now be described more fully with reference to the accompanying drawings.

Figure 1:
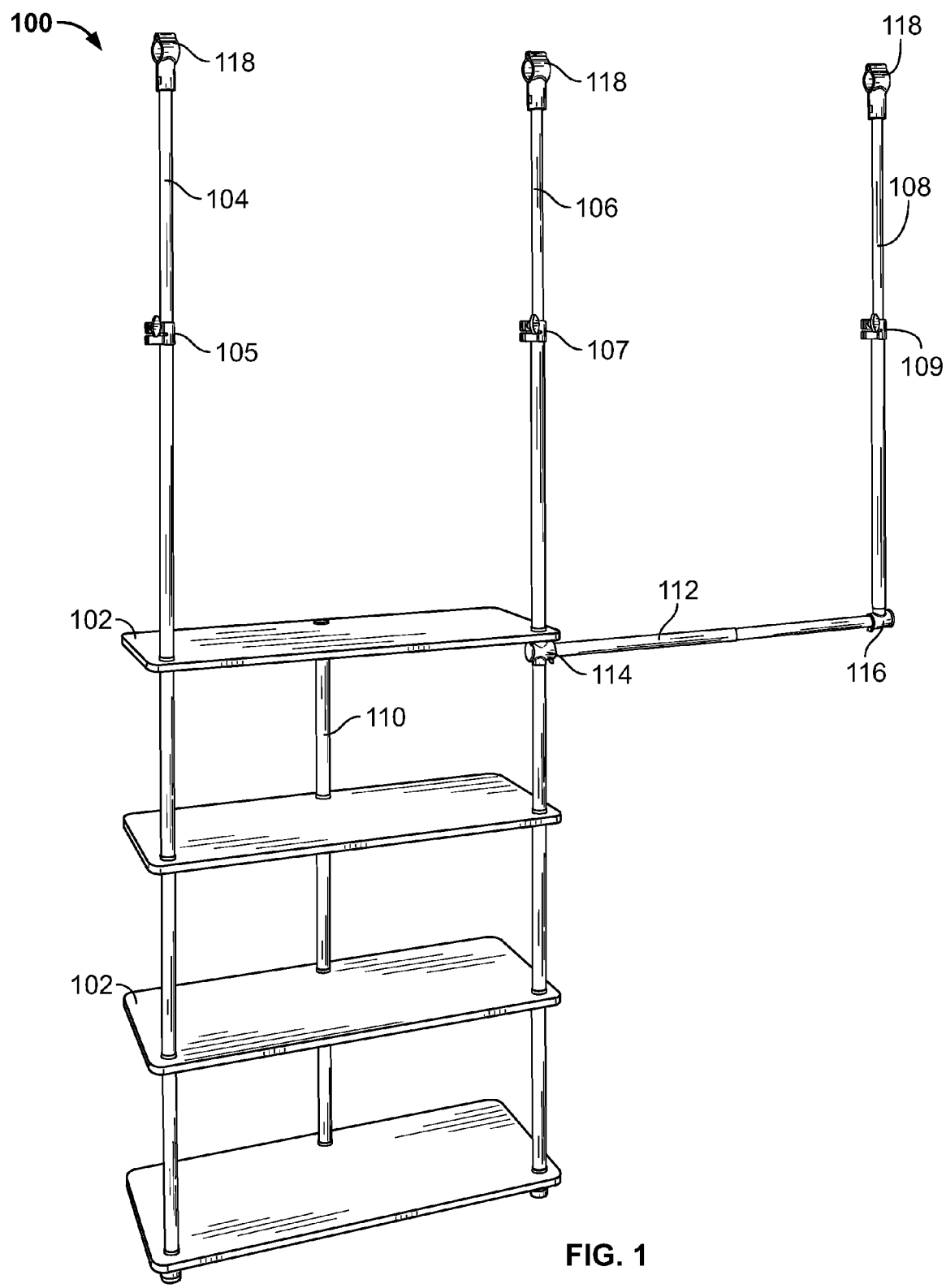
FIG. 1 is a perspective view of an example embodiment of a closet storage assembly according to aspects of the present disclosure.
Figure 2:
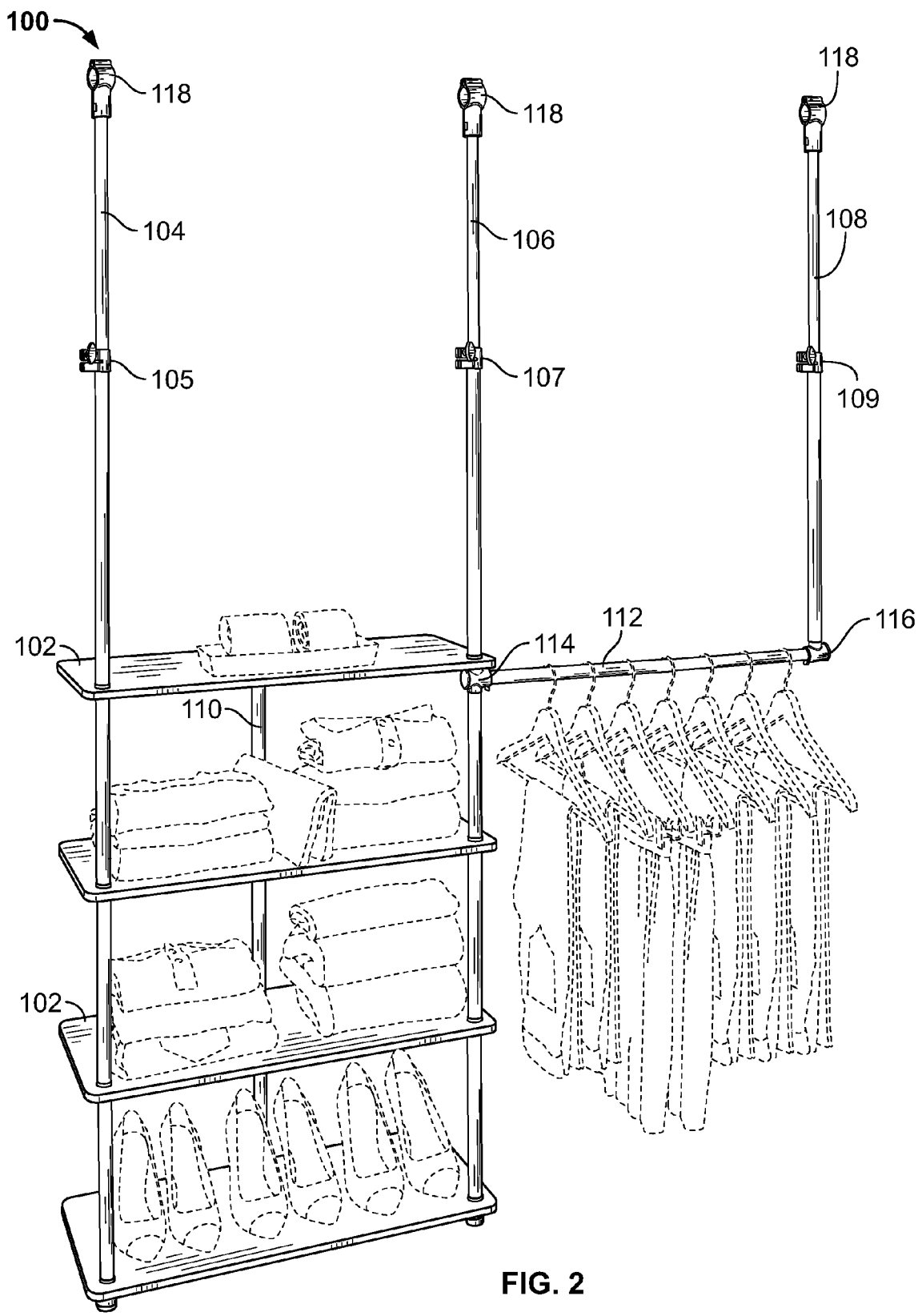
FIG. 2 is a perspective view of the closet storage assembly shown in FIG. 1 illustrating example clothing and other items stored in the closet storage assembly.

FIG. 1 illustrates an example embodiment of a closet storage assembly or system 100 according to aspects of the present disclosure. The closet storage assembly 100 generally includes multiple (e.g., a plurality, plural, etc.) horizontal shelves 102. Each horizontal shelf 102 is substantially parallel with the other horizontal shelves and spaced apart from the other horizontal shelves to allow suitable items (e.g., clothing, shoes, hats, accessories, jewelry, etc.) to be stored on the shelves, as shown in FIG. 2. Each horizontal shelf 102 may be made out of any suitable material (e.g., metal, plastic, wood, etc.), and may have any suitable shape (e.g., rectangular, circular, triangular, square, etc. Although FIG. 1 illustrates four horizontal shelves 102 aligned with one another, other exemplary embodiments may include more or less horizontal shelves, some horizontal shelves that are not aligned with one another, some horizontal shelves that are different sizes, some horizontal shelves that are spaced apart by different distances, and/or some shelves that are not substantially parallel, etc.

As shown in FIG. 1, the height of the horizontal shelves 102 may be designed to cover approximately the bottom half of a closet or other storage space, such that the bottom horizontal shelf is adjacent a bottom of the closet and the top horizontal shelf is adjacent a middle of the closet. This may allow a user to access items stored on the horizontal shelves 102 (as shown in FIG. 2) while standing in the closet, kneeling, reaching down and/or up, etc. In other embodiments the top and/or bottom horizontal shelves 102 may be higher and/or lower as desired.

The closet storage assembly 100 includes vertical rods 104, 106 and 108 (broadly, vertical supports or support members). Each vertical rod is substantially parallel with the other vertical rods and substantially perpendicular with the horizontal shelves 102, while having a top end and a bottom end opposite the top end. Vertical rods 104 and 106 are coupled to the horizontal shelves 102 to provide support for the horizontal shelves. As shown in FIG. 1, each horizontal shelf 102 includes openings on the left and right sides of the horizontal shelf 102, near the front of the horizontal shelf 102. Vertical rods 104 and 106 extend through the openings to provide support for each horizontal shelf. As shown in FIG. 1, vertical rod 104 extends through openings near the left front corner of each horizontal shelf 102, and vertical rod 106 extends through openings near the right front corner of each horizontal shelf 102. As such, these openings of each horizontal shelf 102 are aligned. In other embodiments, each horizontal shelf may include more or less openings, openings positioned in different locations on each horizontal shelf, openings that are not aligned etc.

The vertical rods 104 and 106 may couple to and/or support the horizontal shelves 102 using any suitable fasteners. FIG. 1 illustrates rods 104 and 106 extending through first and second sets of aligned openings in the horizontal shelves 102 to couple the horizontal shelves 102 (e.g., via rubber friction fits, plastic friction fits, snap fits, screws, pins, etc.). In other embodiments, vertical rods 104 and 106 may not extend through openings in the horizontal shelves 102, and may couple horizontal shelves using other fasters (e.g., brackets, screws, pins, nails, bolts, prongs, etc.). For example, the vertical rods 104 and 106 may extend along an outside edge of the horizontal shelves 102 and support the horizontal shelves 102 using fasteners extending outward from the vertical rods 104 and 106 towards the horizontal shelves 102. Or, for example, the vertical rods 104 and 106 may comprise multiple pieces (e.g., five pieces or segments, etc.) that are positioned between shelves within openings in the shelves but without extending completely through the shelves.

The vertical rods 104 and 106 may be any rods suitable for supporting horizontal shelves 102. For example, vertical rods 104 and 106 may be telescoping rods that can be extended or retracted to a desired length. Such rods may include one or more segments having slightly different diameters such that segments may slide inside one another for shorter extensions and slide apart for longer extensions. The vertical rods 104 and 106 may include single unitary rods, or may include one or more segments which may be coupled together as a rod assembly. Each rod may include one or more clamping or locking mechanisms or pieces 105, 107 to substantially lock or hold in place the rod at a desired extension. This adjustability may thus allow the vertical rods 104, 106 to be used in differently sized closets as the length or height of the rods 104, 106 may be increased or decreased depending on the size of the particular closet in which they will be used. Each rod may comprise any suitable material (e.g., metal, plastic, etc.) and may have any suitable cross section shape (e.g., circular, square, triangular, etc.).

In the example shown in FIGS. 1 and 2, each vertical rod 104, 106 may include five total pieces or segments. The top piece may have a smaller diameter such that it can slide telescopingly into and out the piece immediately below it. The top piece may then be locked or held in place by a clamp or lock mechanism 105, 107. In this exemplary manner, the overall length or height of the rods 104, 106 may thus be adjusted accordingly. The end portions of the four lower pieces may be positioned within openings defined along the top and bottom of the shelves 102.

As shown in FIG. 1, each vertical rod 104 and 106 extends to about twice the height of the top horizontal shelf 102. This may allow each vertical rod 104 and 106 to be supported at a bottom end by placement on a floor of the closet, and to be supported at a top end by connection to an upper fixture or portion of the closet. In other embodiments, each vertical rod 104 and 106 may extend to higher or lower portions of the closet, and the top horizontal shelf 102 may be higher or lower than approximately the middle of each vertical rod.

Another vertical rod 110 (broadly, a vertical support or support member) may also be substantially parallel with the other vertical rods and substantially perpendicular to the horizontal shelves 102. As shown in FIG. 1, the vertical rod 110 is coupled to the horizontal shelves 102 to provide additional support for the horizontal shelves. The vertical rod 110 extends through a third set of aligned openings near the back of each horizontal shelf adjacent a middle of the horizontal shelf 102. The vertical rod 110 extends only from the bottom horizontal shelf 102 to the top horizontal shelf 102. The vertical rod 110 may comprise a single piece rod or a multipiece rod assembly. The vertical rod 110 may comprise any suitable material (e.g., metal, plastic, etc.) and may have any suitable cross section shape (e.g., circular, square, triangular, etc.). Other embodiments may include vertical rods in different locations relative to the horizontal shelves, more or less vertical rods, vertical rods that extend to different heights, etc.

The closet storage assembly 100 also includes a horizontal rod 112 which is substantially perpendicular to the vertical rods 104, 106, 108 and 110, and is substantially parallel to the horizontal shelves 102. The horizontal rod 112 extends outwardly from vertical rod 106 at about a middle point of vertical rod 106. The horizontal rod 112 is approximately aligned with the front of the top horizontal shelf 102. As shown in FIG. 2, the height at which the horizontal rod 112 is positioned above the floor may be designed such that the horizontal rod 112 can support clothes on hangers for storage. There may be enough space below the horizontal rod 112 to allow the clothes to hang, while also allowing space for clothes to hang from an upper portion of the closet above the horizontal rod 112. The height of the top horizontal shelf 102 may also be designed such that clothes can hang above horizontal shelf 102.

The horizontal rod 112 may be a similar rod to the vertical rods 104, 106, 108, and 110, or may be a different type of rod (e.g., metal rod, plastic rod, telescoping rod, circular cross section rod, square cross sectional rod, etc.). As shown in FIG. 1, the horizontal rod 112 extends to a width approximately similar to the width of the horizontal shelf 102. The horizontal rod 112 may comprise a single piece rod or a multi-piece rod. For example, the horizontal rod 112 may include first and second pieces or segments (left and right pieces in FIG. 1). The second piece may have a smaller diameter such that it can slide telescopingly into and out of the first piece to thereby change the overall length of the horizontal rod 112. This adjustability may thus allow the horizontal rod 112 to be used in differently sized closets as the length of the horizontal rod 112 may be increased or decreased depending on the width of the particular closet in which it will be used. The horizontal rod 112 may comprise any suitable material (e.g., metal, plastic, etc.) and may have any suitable cross section shape (e.g., circular, square, triangular, etc.). In other embodiments, more or less horizontal rods may be used, each horizontal rod may extend a different length, each horizontal rod may not be perpendicular to the vertical rods or parallel with the horizontal shelves, each horizontal rod may extend from a higher or lower point on a vertical rod, each horizontal rod may not be aligned with a top horizontal shelf, etc.

The vertical rod 108 is coupled to an end of horizontal rod 112 and extends upward from horizontal rod 112. The vertical rod 108 may be different than or substantially similar to vertical rods 104, 106, and 110. The vertical rod 108 may provide support for horizontal rod 112 while the horizontal rod holds clothes, hangers, etc. and may have a suitable length extending from the end of the horizontal rod 112 to an upper portion or fixture of the closet. As shown in FIG. 1, the vertical rod 108 is about half the length of vertical rods 104 and 106. The vertical rod 108 may comprise a single piece rod or a multipiece rod assembly. In this example, the vertical rod 108 may include two pieces or segments where the top piece has a smaller diameter such that it can slide telescopingly into and out of the other piece. The top piece may then be locked or held in place by a clamp or lock mechanism 109. In this exemplary manner, the overall length or height of the vertical rod 108 may thus be adjusted accordingly. In other embodiments, more or less vertical rods may support horizontal rod 112 and/or vertical rod 108 may have a greater or lesser length, etc.

The closet storage assembly 100 includes a T-connector 114 coupled between the horizontal rod 112 and the vertical rod 106. As shown in FIG. 1, the T-connector 114 is coupled to a middle portion of the vertical rod 106 located between the top end and bottom end of the vertical rod 106. For example, the T-connector 114 may be coupled to and between oppositely facing upper and lower end portions of two adjacent pieces, respectively, of a multipiece rod assembly in exemplary embodiments. Other embodiments may include more than one T-connector, T-connectors positioned in different locations along the length of a vertical rod, T-connectors coupling different rods, etc.

FIGS. 3-9 illustrate different views of the T-connector 114. The T-connector 114 includes an opening 126 configured to receive an end portion of the horizontal rod 112. The opening 126 may include any suitable configuration for receiving the horizontal rod 112. For example, the opening 126 may have an inner diameter that corresponds to or is about equal to an outer diameter of the horizontal rod 112. The horizontal rod 112 may have a protrusion at an end of the horizontal rod 112 that may be received in the opening 126.

Figure 9:
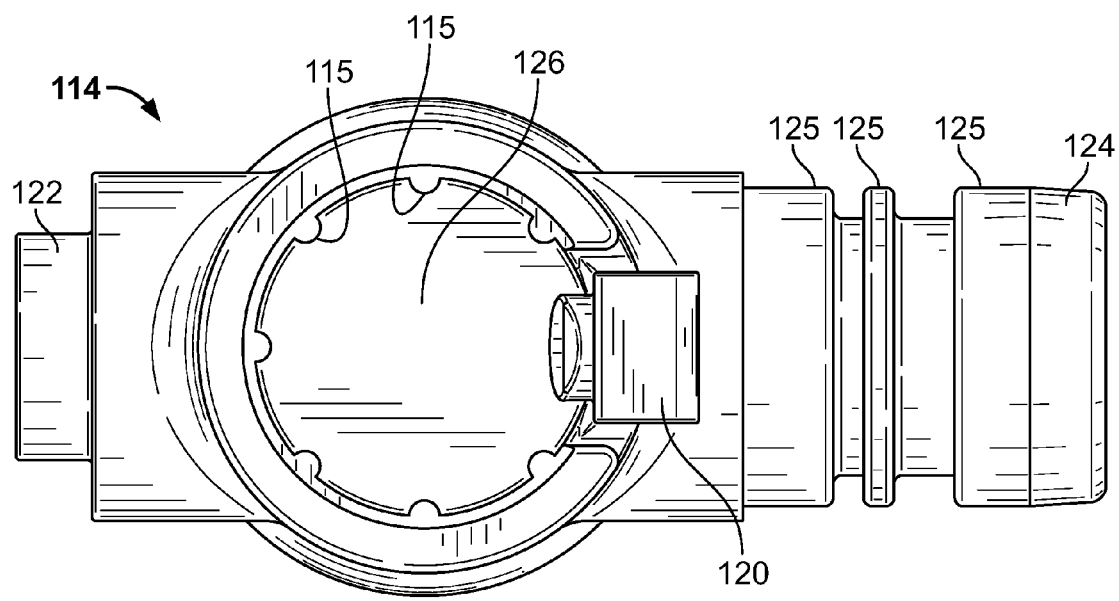

As shown in FIG. 9, the T-connector 114 also includes protrusions, bumps, or inwardly protruding portions 115 that are spaced apart from each other along the inner perimeter or circumference of the opening 126. The inwardly protruding portions 115 may be resilient and help create a friction or interference fit with the end portion of the horizontal rod 112 that is received within the opening 126.

The T-connector 114 also includes a flexible and/or resilient tab 120 adjacent the opening 126. The flexible tab 120 is configured to engage the end portion of the horizontal rod 112 to secure the end portion of the horizontal rod 112 in the opening 126. The horizontal rod 112 may include an opening adjacent the end portion of the horizontal rod 112, and the flexible tab 120 may engage the opening in the horizontal rod 112. For example, the horizontal rod 112 may have a hole, cutout, etc. on an outer surface at one end portion, which may be engaged by a protrusion, pin, etc. of the flexible tab 120 when the end portion of the horizontal rod 112 is inserted into the opening 126. The flexible tab 120 may snap into place when the end portion of the horizontal rod 112 is engaged. The flexible tab 120 may comprise any suitable material for engaging the horizontal rod (e.g., plastic, injection molded material, etc.).

The flexible tab 120 may inhibit the horizontal rod 112 from being removed from or pulled out of the opening 126 after the flexible tab 120 is engaged. This flexible tab 120 may therefore secure the horizontal rod 112 in the T-connector 114 and provide easier coupling and decoupling of the horizontal rod 112 for a user. A user may be able to simply slide an end portion of the horizontal rod 112 into the opening 126 of the T-connector 114 and allow the flexible tab 120 to engage the end portion of the horizontal rod 112 to make a connection. When the user is ready to remove the horizontal rod 112, the user may simply press or lift the flexible tab 120, etc. in order to decouple the end portion of the horizontal rod 112 and then slide the end portion of the horizontal rod 112 out of the T-connector 114.

The T-connector 114 also includes a vertical rod coupler 122 substantially perpendicular to the opening 126. The vertical rod coupler 122 may be configured to couple an end portion of the vertical rod 106. For example, the vertical rod 106 may include one or more segments having a threaded protrusion at the end portion. The vertical rod coupler 122 may include a threaded opening 123 configured to receive the threaded protrusion of the vertical rod 106. In some embodiments, the vertical rod 106 may have a threaded outer surface at one end portion, may snap into the vertical rod coupler 122, may have a friction fit with the vertical rod coupler 122, etc. Alternatively, or in addition, the vertical rod 106 may include an opening configured to receive therein and surround the outer or external portion of the vertical rod coupler 122. For example, the vertical rod coupler 122 may include a portion having an outer diameter which corresponds to or is about equal to an inner diameter of the vertical rod 106. The vertical rod coupler protrusion may be threaded along with the inner diameter of the vertical rod 106 such that they are screwed together, the vertical rod may couple the vertical rod coupler via a snap fit, an interference or friction fit, etc.

Figure 3:
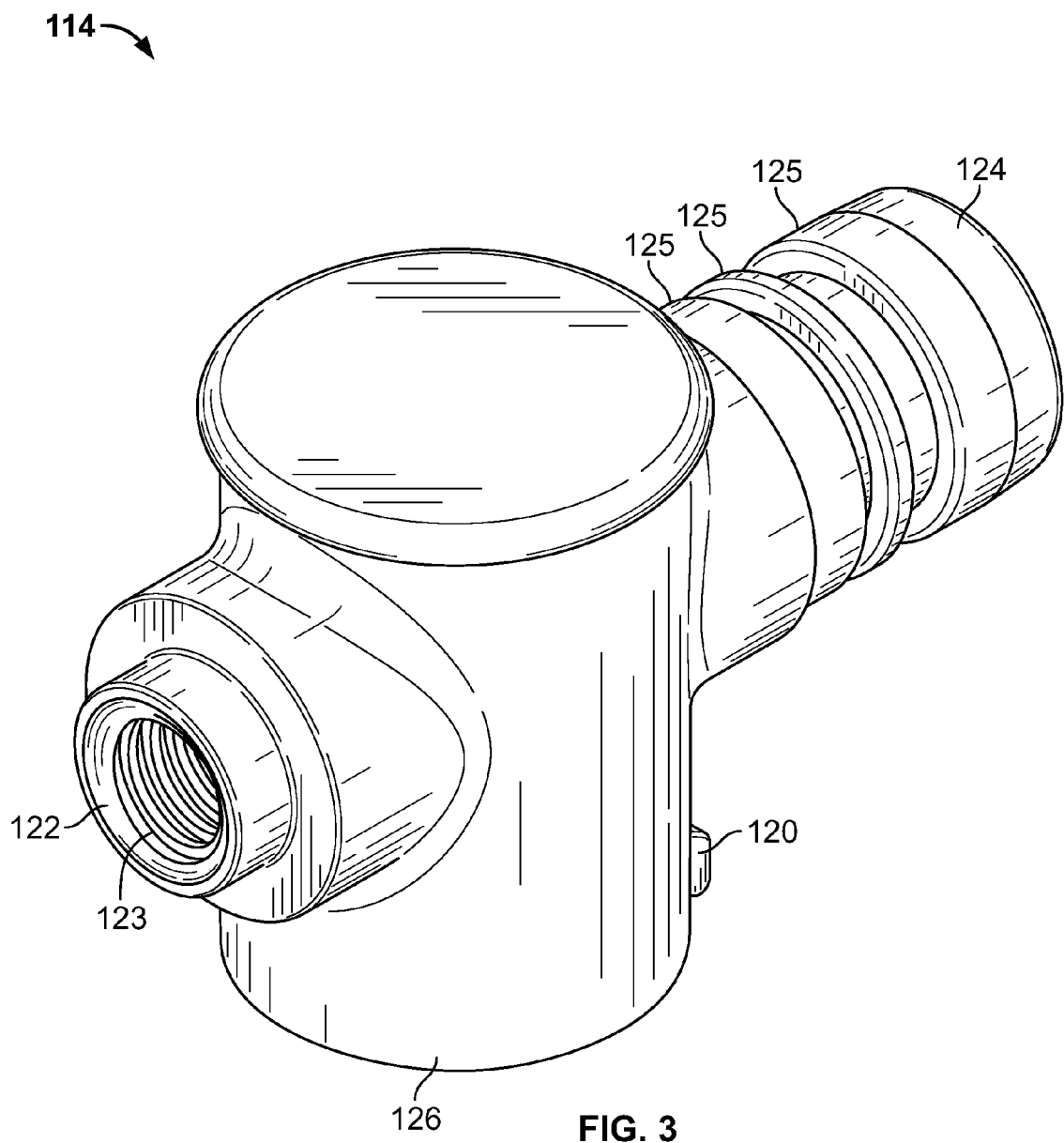
FIGS. 3-9 illustrate several views of an example T-connector, which may be used in the closet storage assembly shown in FIG. 1.
Figure 4:
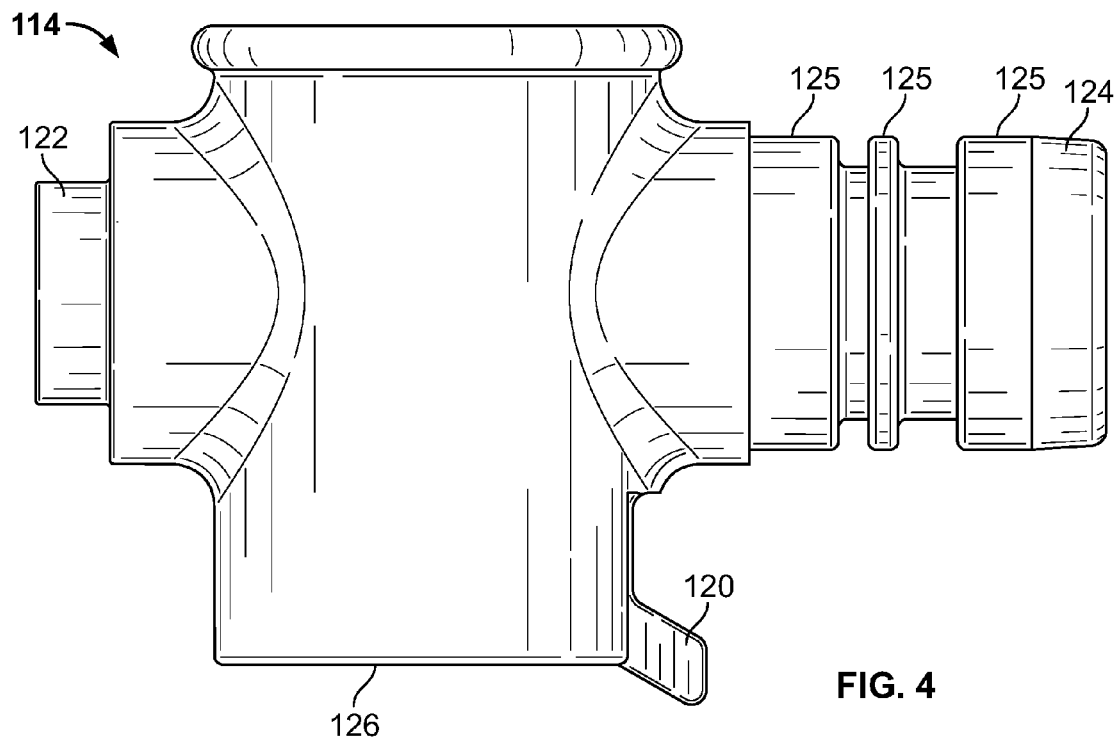
Figure 5:
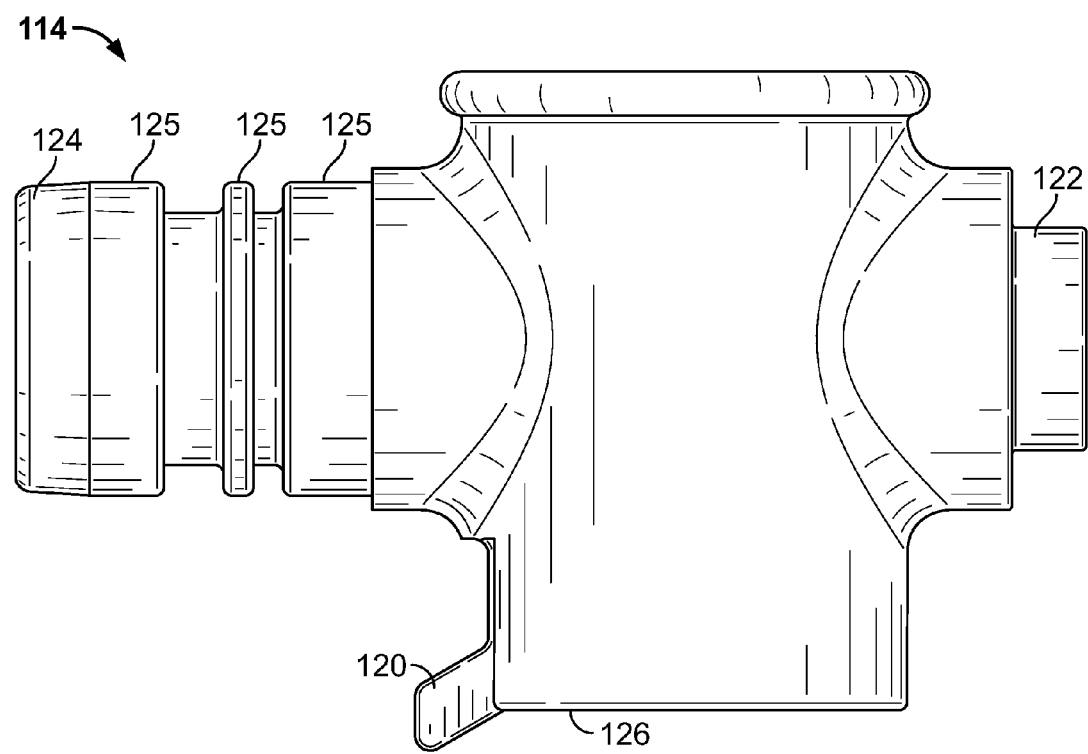
Figure 6:
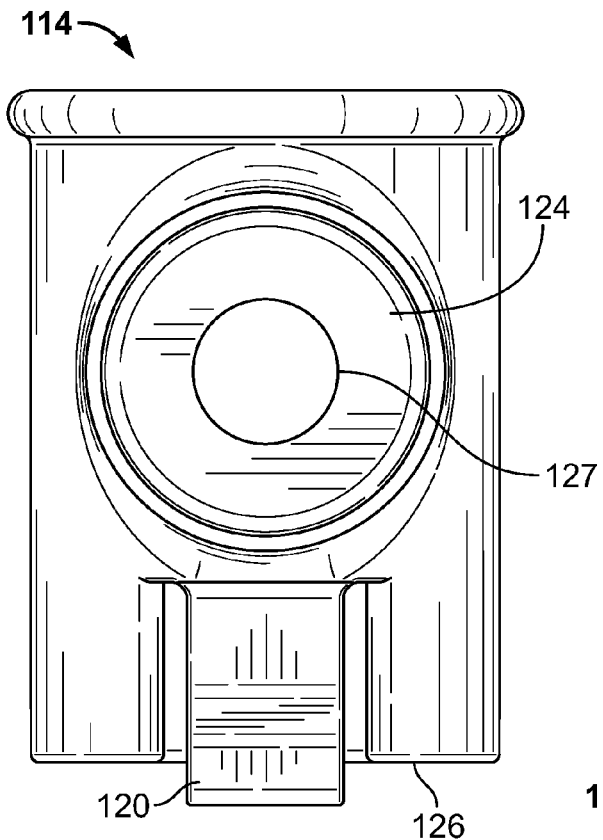
Figure 7:
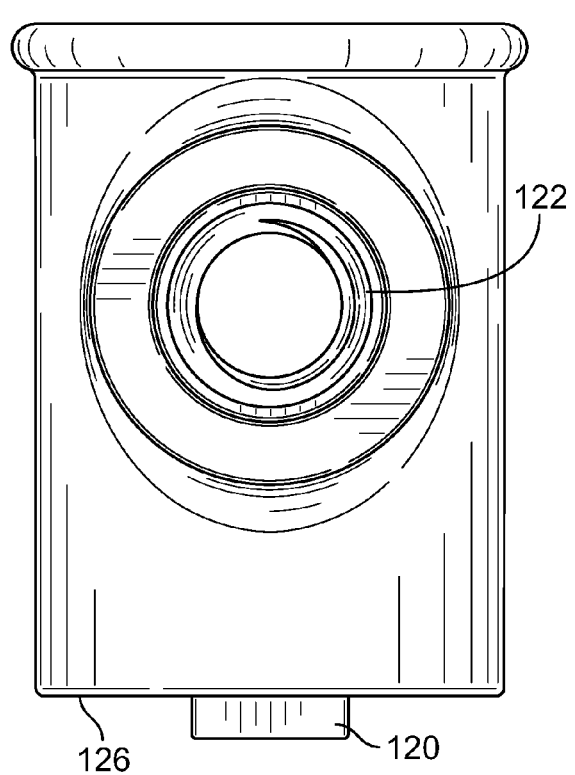
Figure 8:
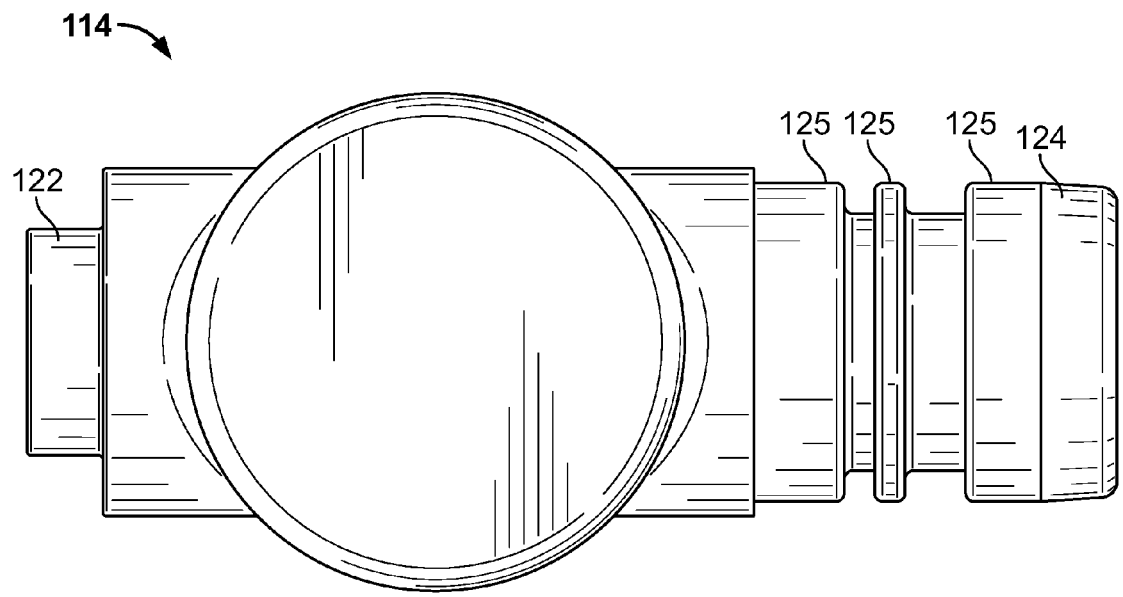

The T-connector 114 also includes another vertical rod coupler 124 opposite the vertical rod coupler 122 and substantially perpendicular with the opening 126. Accordingly, the two vertical rod couplers 122 and 124 may form a T shape with the opening 126. The vertical rod coupler 124 may be different than or substantially similar to the vertical rod coupler 122. As shown in FIGS. 3-5, the vertical rod coupler 124 may include one or more shoulder or ring portions 125 (e.g., similar to hose barbs, etc.) having various outer diameters, which may form an interference or friction fit against an interior diameter of the vertical rod 106. The vertical rod coupler 124 also includes an opening 127 (FIG. 6) that may also be used when coupling to a vertical rod. Other embodiments may include a vertical rod coupler 124 having a different vertical rod coupler type, e.g., such as those described above relative to vertical rod coupler 122, etc.

The T-connector 114 allows connection of the horizontal rod 112 to a middle portion of vertical rod 106. For example, vertical rod 106 may include at least an upper segment and a lower segment, with a lower segment coupled to vertical rod coupler 124 and an upper segment coupled to vertical rod coupler 122. In other embodiments, the T-connector 114 may be coupled in different locations, coupled to different vertical rod segments, etc. The T-connector 114 may comprise any suitable material for coupling rods (e.g., plastic, metal, rubber, injection molded material, etc.). T-connector 114 is not limited to closet storage assembly 100, and may be used in other closet storage assemblies, other applications for connecting rods, etc.

FIGS. 10-16 illustrate multiple views of elbow connector 116. As shown in FIG. 1, elbow connector 116 couples an end portion of horizontal rod 112 to vertical rod 108. The elbow connector 116 may be similar to the T-connector 114, but may include one less vertical rod coupler, such that the elbow connector 116 only couples to a vertical rod at one point.

Figure 16:
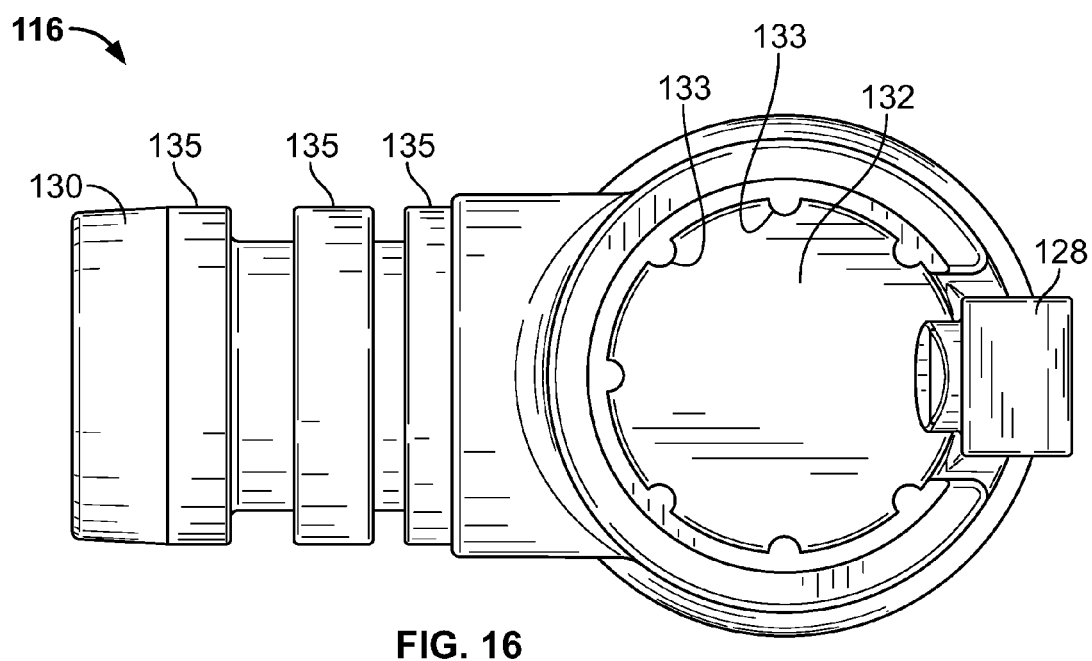
Figure 17:
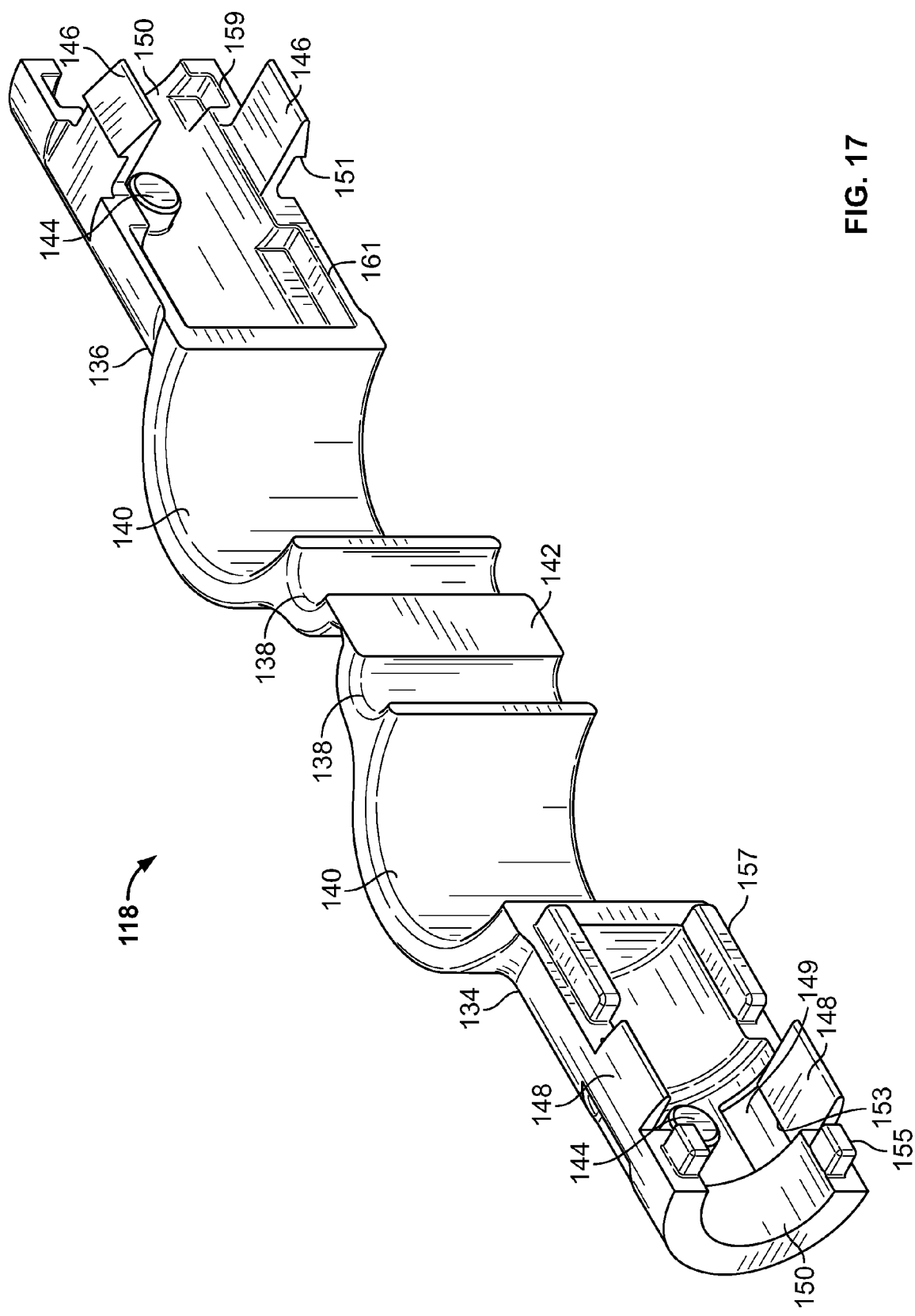
Figure 21:
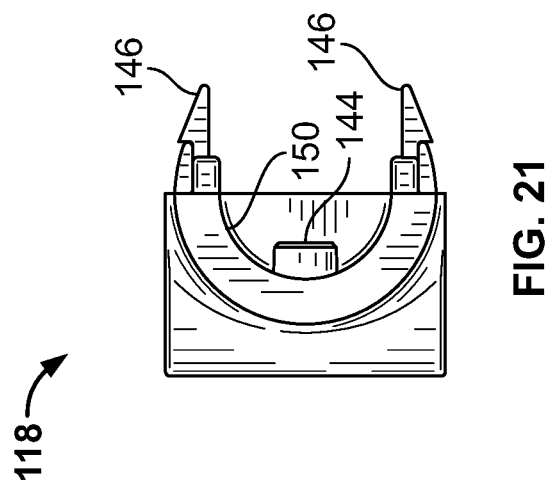
Figure 20:
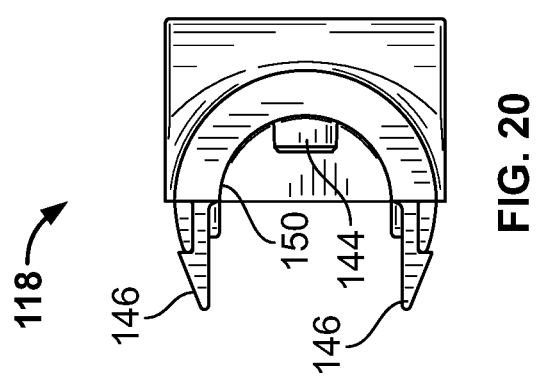

As shown in FIGS. 10-16, the elbow connector 116 includes an opening 132 for receiving an end portion of the horizontal rod 112. The opening 132 may include any suitable configuration for receiving the end portion of the horizontal rod 112. For example, the opening 132 may have an inner diameter that corresponds to or is about equal to an outer diameter of the horizontal rod 112. The horizontal rod 112 may have a protrusion at an end of the horizontal rod 112 that may be received in the opening 132. As shown in FIG. 16, the elbow connector 116 also includes protrusions, bumps, or inwardly protruding portions 133 that are spaced apart from each other along the inner perimeter or circumference of the opening 132. The inwardly protruding portions 133 may be resilient and help create a friction or interference fit with the end portion of the horizontal rod 112 that is received within the opening 132.

The elbow connector 116 also includes a flexible and/or resilient tab 128 configured to engage the end portion of the horizontal rod 112 to inhibit movement of the horizontal rod 112 out of the elbow connector 116. The flexible tab 128 may be any suitable flexible tab, e.g., such as the flexible tab 120 described above for the T-connector 114, etc. The flexible tab 128 may be different than or substantially similar to the flexible tab 120 of the T-connector 114.

The horizontal rod 112 may include an opening adjacent the end portion of the horizontal rod 112, and the flexible tab 128 may engage the opening in the horizontal rod 112. For example, the horizontal rod 112 may have a hole, cutout, etc. on an outer surface at one end portion, which may be engaged by a protrusion, pin, etc. of the flexible tab 128 when the end portion of the horizontal rod 112 is inserted into the opening 132. The flexible tab 128 may snap into place when the end portion of the horizontal rod 112 is engaged. The flexible tab 128 may comprise any suitable material for engaging the horizontal rod (e.g., plastic, injection molded material, etc.).

The flexible tab 128 may inhibit the horizontal rod 112 from being removed from or pulled out of the opening 132 after the flexible tab 128 is engaged. This flexible tab 128 may therefore secure the horizontal rod 112 in the elbow connector 116 and provide easier coupling and decoupling of the horizontal rod 112 for a user. A user may be able to simply slide an end portion of the horizontal rod 112 into the opening 132 of the elbow connector 116 and allow the flexible tab 128 to engage the end portion of the horizontal rod 112 to make a connection. When the user is ready to remove the horizontal rod 112, the user may simply press or lift the flexible tab 128, etc. in order to decouple the end portion of the horizontal rod 112 and then slide the end portion of the horizontal rod 112 out of the elbow connector 116.

The elbow connector 116 also includes a vertical rod coupler 130 configured to couple to the vertical rod 108. The vertical rod coupler 130 may be any suitable vertical rod coupler, e.g., such as the vertical rod coupler 124 of the T-connector 114 described above, etc. The vertical rod coupler 130 may be different than or substantially similar to the vertical rod coupler 124 of the T-connector 114. The vertical rod coupler 130 of the elbow connector 116 may be substantially perpendicular to the opening 132 of elbow connector 116 to form approximately a ninety degree angle between rods coupled to the opening 132 and the vertical rod coupler 130. In other embodiments, the opening 132 and the vertical rod coupler 130 may not be substantially perpendicular and may have an angle between them of more or less than ninety degrees.

Figure 10:
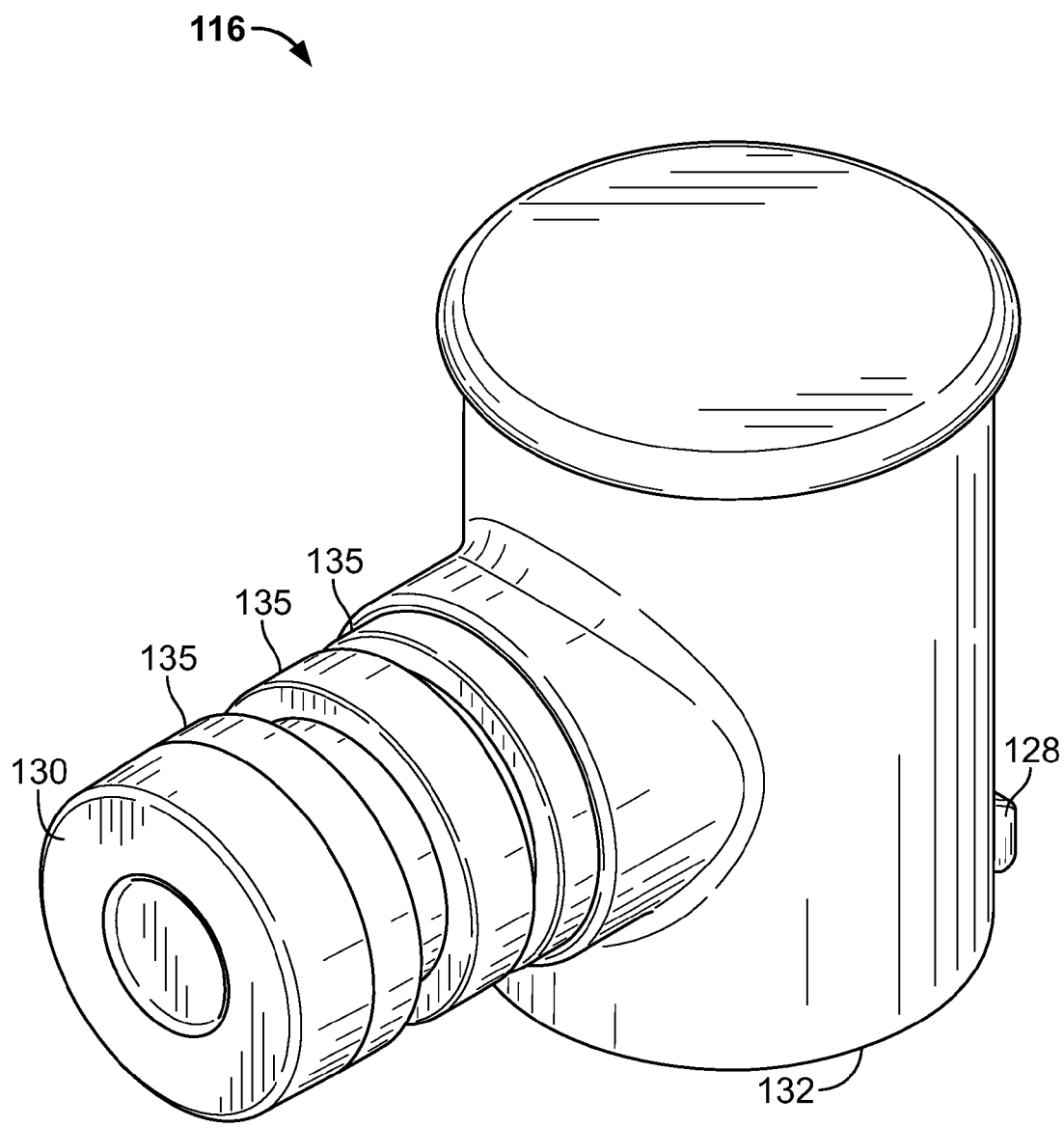
FIGS. 10-16 illustrate several views of an example elbow connector, which may be used in the closet storage assembly shown in FIG. 1.
Figure 11:
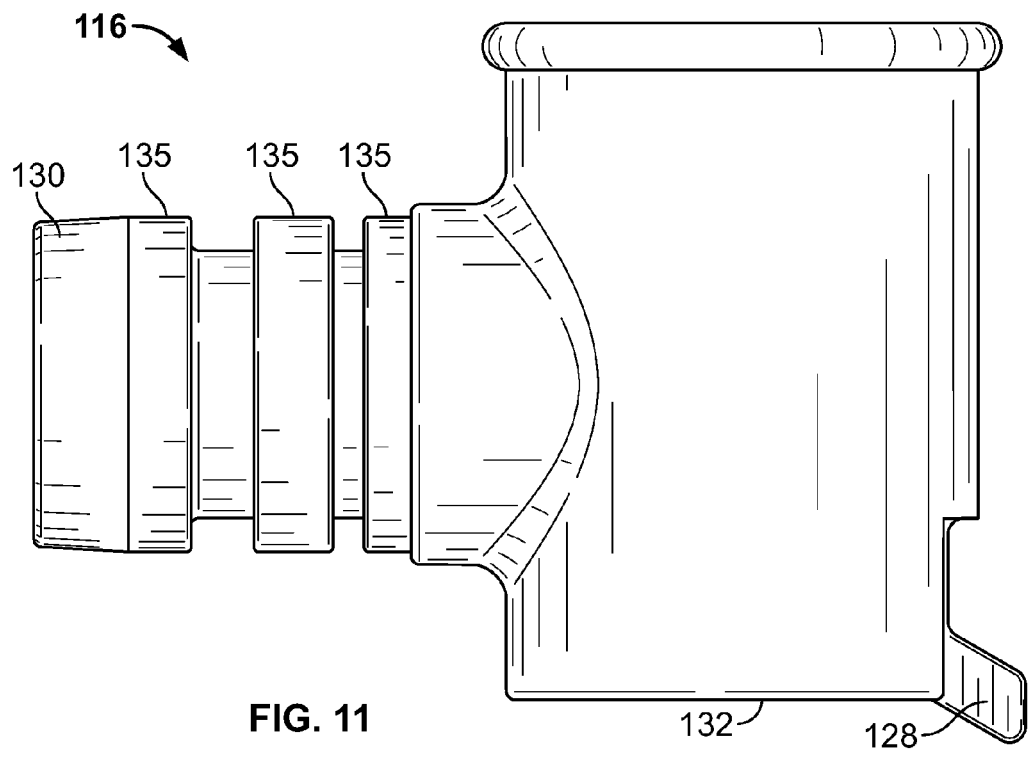
Figure 12:
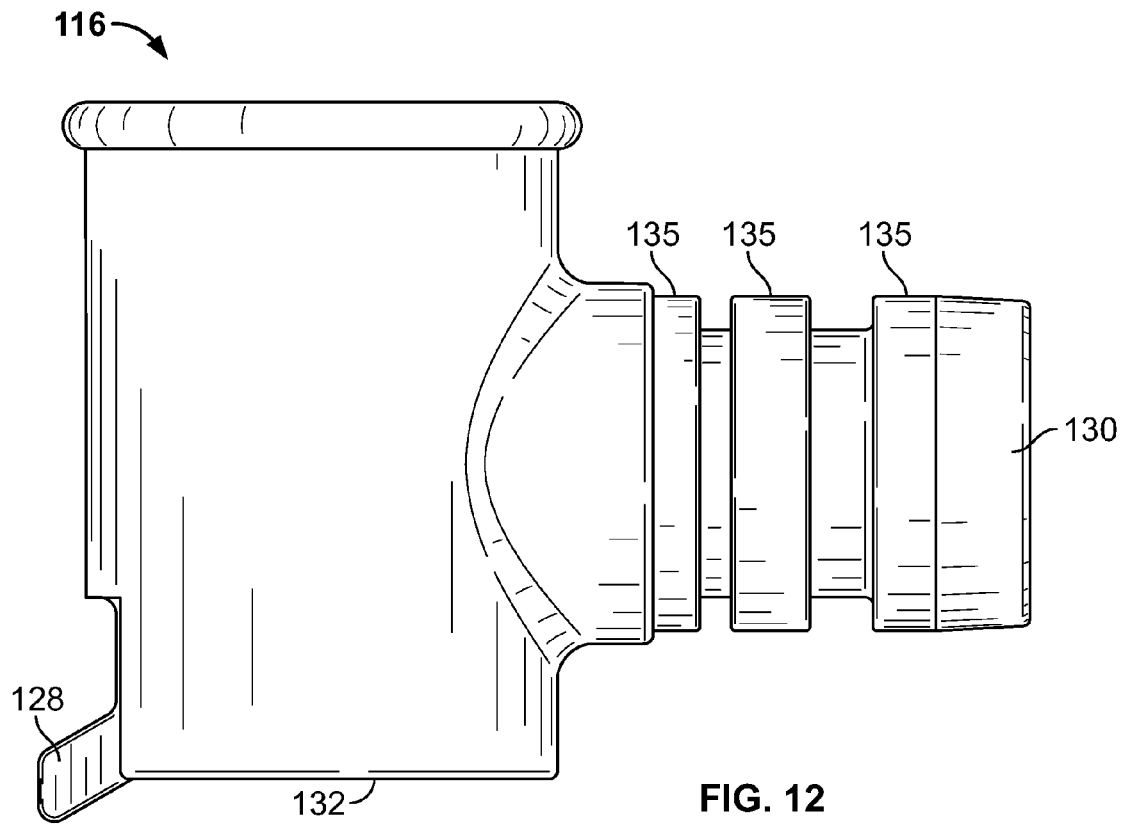
Figure 13:
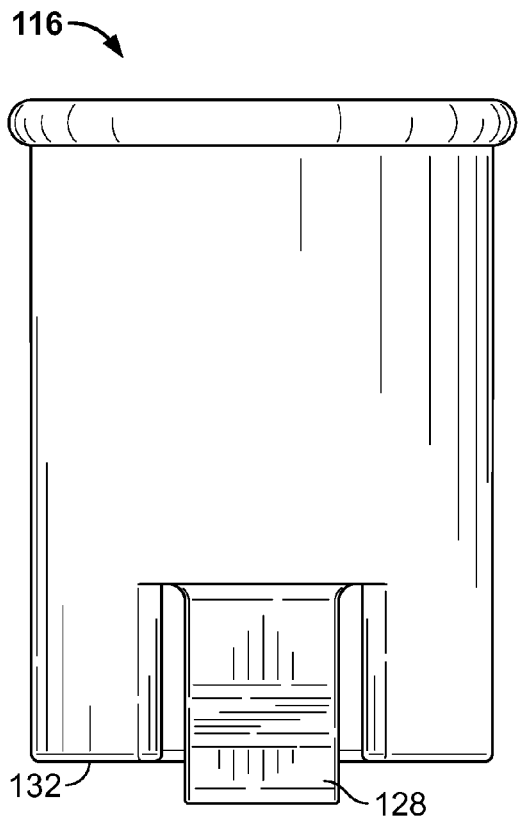
Figure 14:
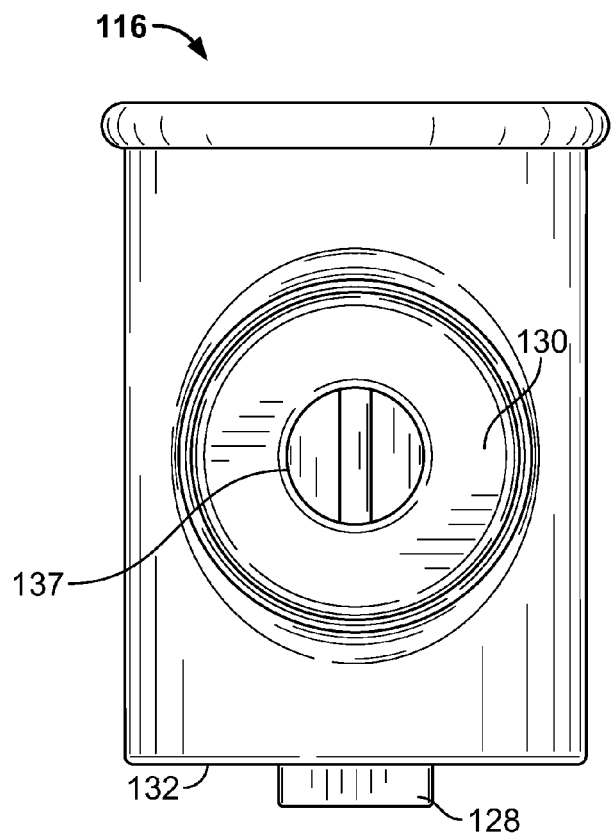
Figure 15:
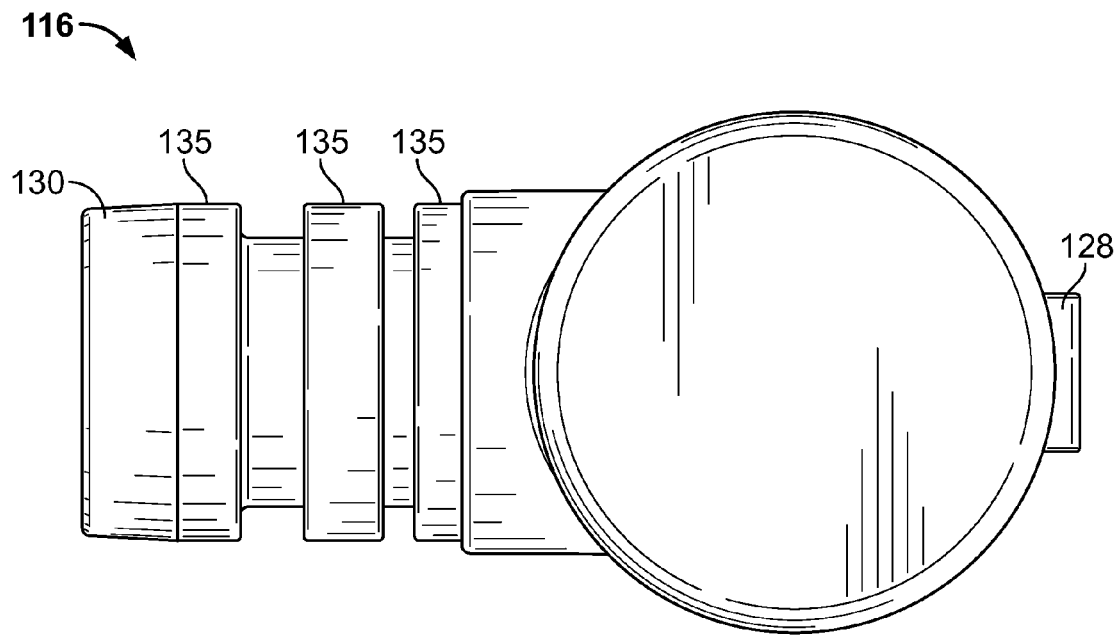

As shown in FIGS. 10-12, the vertical rod coupler 130 may include one or more shoulder or ring portions 135 (e.g., similar to hose barbs, etc.) having various outer diameters, which may form an interference or friction fit against an interior diameter of the vertical rod 106. The vertical rod coupler 130 also includes an opening 137 (FIG. 14) that may also be used when coupling to a vertical rod. Other embodiments may include a vertical rod coupler 130 having a different vertical rod coupler type, e.g., such as those described above relative to vertical rod coupler 122, etc.

An end of the elbow connector 116 opposite opening 132 may be closed or sealed such that there are only two points for rods to couple to the elbow connector 116. Thus, the elbow connector 116 may resemble the shape of a bent elbow. Although FIG. 1 illustrates the elbow connector 116 as coupled between the horizontal rod 112 and the vertical rod 108, the elbow connector 116 may be used in other locations to couple different rods in the closet storage assembly 100. In other embodiments, the elbow connector 116 may be used in different storage assemblies or other systems suitable for coupling two rods together.

FIGS. 17-23 illustrate a bracket (e.g., upper bracket, etc.) 118. The upper bracket 118 includes two bracket portions or halves 134 and 136. The first bracket portion 134 defines a wire hang rod recess 138 and a pole hang rod recess 140. The wire hang rod recess 138 may be configured to engage a wire hang rod of a closet. For example, a closet containing the closet storage assembly 100 may include a wire hang rod near the top of the closet (e.g., as a standalone wire hang rod, as part of a shelf in the closet, etc.). The wire hang rod recess 138 may be shaped (e.g., circular, etc.) to engage the wire hang rod. The wire hang rod recess 138 may have an inner diameter corresponding to or about equal to the outer diameter of the wire hang rod.

Similarly, the pole hang rod recess 140 may be configured to engage a pole hang rod of a closet. For example, the closet containing closet storage assembly 100 may include a pole hang rod near the top of the closet (e.g., as a standalone pole hang rod, as part of a shelf in the closet, supported by hooks in the closet, etc.). The pole hang rod recess 140 may be shaped (e.g., circular, etc.) to engage the pole hang rod. The pole hang rod recess 140 may have an inner diameter corresponding to or about equal to the outer diameter of the wire hang rod.

The upper bracket 118 also includes a living hinge 142 between the first and second bracket portions 134 and 136. The living hinge 142 allows the bracket portions 134 and 136 to hingedly close, pivot, or rotate relative to one another such that they can move from an open position (as shown in FIGS. 17-23) to a closed position (as shown in FIGS. 1 and 2). When the bracket portions 134 and 136 are closed together, the wire hang rod recesses 138 align together to form a wire hang rod opening or hole configured to engage a wire hang rod, and the pole hang rod recesses 140 align together to form a pole hang rod opening or hole configured to engage a pole hang rod. For example, the wire hang rod recesses 138 form an opening (or wire hang rod portion) corresponding to the size of a wire hang rod such that the wire hang rod can extend through the wire hang rod opening created by the aligned wire hang rod recesses 138. Similarly, the pole hang rod recesses 140 form an opening (or pole hang rod portion) corresponding to the size of a pole hang rod such that the pole hang rod can extend through the pole hang rod opening created by the aligned pole hang rod recesses 140.

The living hinge 142 allows the upper bracket 118 to be placed about the wire hang rod and/or pole hang rod. The bracket portions 134 and 136 can then be closed together such that the wire hang rod recesses 138 and/or pole hang rod recesses 140 surround the wire hang rod and/or pole hang rod to engage the upper bracket 118 about the wire hang rod or pole hang rod. This allows for a simple connection for a user to bend the upper bracket 118 around a wire hang rod and/or pole hang rod to couple the upper bracket 118 to the wire hang rod and/or pole hang rod. Because the upper bracket has wire hang rod recesses 138 and pole hang rod recesses 140, the upper bracket may easily couple to a closet having either a wire hang rod or a pole hang rod. Although the wire hang rod recesses 138 and pole hang rod recesses 140 are shown in FIGS. 17-23 as circular, other shapes corresponding to wire hang rods or pole hang rods may be used in other embodiments (e.g., square, rectangular, etc.). While including both wire hang rod recesses 138 and pole hang rod recesses 140 allows a single upper bracket 118 to couple to either wire or pole hang rods, some embodiments may include only a wire hang rod recess or a pole hang rod recess corresponding to the type of closet the upper bracket 118 will be used in.

The wire hang rod recesses 138 may have a smaller diameter than the pole hang rod recesses 140, and the wire hang rod recesses 138 may be disposed closer to the living hinge 142. In other embodiments, the wire hang rod recesses 138 may have a same or larger diameter than the pole hang rod recesses 140, the wire hang rod recesses 138 may be located further from the living hinge 142 than the pole hang rod recesses 140, there may be more or less wire hang rod recesses or pole hang rod recesses, etc.

The bracket portions 134 and 136 may comprise any suitable material for coupling to a wire hang rod and/or pole hang rod (e.g., metal, plastic, injection molded material, etc.). The living hinge 142 may comprise any suitable material allowing the bracket portions 134 and 136 to rotate relative to one another (e.g., plastic, a metal hinge, a pin, injection molded material, etc.). The living hinge 142 may be formed integrally (e.g., injection molded, etc.) with the bracket portions 134 and 136, or may be coupled between the bracket portions 134 and 136.

The upper bracket 118 includes vertical rod opening recesses 150 on each bracket portion 134 and 136. These vertical rod opening recesses align to form a vertical rod opening when the bracket portions 134 and 136 are moved to a closed position. The vertical rod opening is configured to receive a top end of one of vertical rods 104, 106 and 108.

The upper bracket 118 also includes locking pins 144 disposed on bracket portions 134 and 136. The locking pins 144 may be configured to engage an opening adjacent a top end of vertical rods 104, 106 and 108 to secure the top ends of the vertical rods in the upper brackets 118. For example, each vertical rod 104, 106 and 108 may include an opening on each side of an outer surface of the rod near the top end of the rod. The locking pins 144 may extend through the openings when the upper bracket 118 is in a closed position and the end of a vertical rod is received in the vertical rod opening recesses 150, such that the locking pins resist movement of the vertical rod out of the upper bracket 118. This provides support for the vertical rods 104, 106 and 108 to remain in an upright position in the closet.

The locking pins 144 may be configured to support a load associated with the vertical rods 104, 106 and 108. For example, the locking pins 144 may comprise a suitable material (e.g., plastic, metal, etc.) strong enough to support the vertical rods and any clothes, hangers, etc. hanging from them. In FIGS. 1 and 2, the upper bracket 118 and its locking pins 144 may support vertical rod 108 as it hangs from the upper bracket 118 and may also provide support for the horizontal rod 112 coupled to the vertical rod 108 and any clothes, hangers, etc. hanging from the horizontal rod 112.

The locking pins 144 may be formed integrally (e.g., injection molded, etc.) with the bracket portions 134 and 136, or may be coupled to the bracket portions. The locking pins 144 may extend a length to join together when the bracket portions 134 and 136 are in a closed position, or may have a shorter length merely sufficient to engage openings in the vertical rods 104, 106 and 108. In other embodiments, a single locking pin 144 may be disposed only on one bracket portion 134 or 136, and may extend only through a single opening of a vertical rod 104, 106 or 108, or may extend through two openings of a vertical rod.

The upper bracket 118 may include a snap or latch mechanism to hold the upper bracket 118 closed. For example, the second bracket portion 136 may include tabs 146 engageable with clasps 148 of the first bracket portion 134. The tabs 146 are engageable with and may join together with the clasps 148 to keep the first and second bracket portions 134 and 136 in a closed position. For example, a user may close the first and second bracket portions 134 and 136 together by inserting the tabs 146 past the clasps 148 and into the openings 149 associated with clasps 148 such that the tabs 146 latch onto the clasps 148. In this exemplary manner, the oppositely facing surfaces 151, 153 of the respective tabs 146 and clasps 148 are engaged and abut against one another to thereby resist opening of bracket portions 134 and 136. This may thus create a snap fit in which the bracket portions 134 and 136 may remain in a closed position until the user presses the tabs 146 in and removes them from the openings associated with clasps 148.

The first bracket portion 134 may also include protruding portions 155, 157 that are sized to be engagingly received within corresponding openings 159, 161 of the second bracket portion 136. The engagement of the protruding portions 155, 157 within the openings 159, 161 may help align and retain the first and second bracket portions 134, 136 in the closed position.

Although upper brackets 118 are illustrated as coupled to vertical rods 104, 106, and 108, other embodiments may include more or less brackets, brackets coupled to other rods, brackets used in other storage assemblies, etc.

Some of the example embodiments described herein may provide one or more (but not necessarily any or all) of the following advantages: efficient storage of clothing items and accessories, ease of access to the stored clothing items and accessories, size savings from the compactness of the assembly, increased storage capacity from the additional horizontal shelves and horizontal rod, improved aesthetic appearance from the design of the assembly, ease of coupling and decoupling of rods to the T-connectors and elbow connectors via the flexible tabs (e.g., without tools, a toolless assembly process, etc.), ease of coupling the upper brackets to the vertical rods and wire hang rods or pole hang rods (e.g., without tools, a toolless assembly process, etc.), support for hanging vertical rods and loads associated with the rods, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closet storage assembly comprising:
    multiple horizontal shelves;
    first, second, and third vertical rods configured to be coupled to the multiple horizontal shelves for supporting the horizontal shelves, each vertical rod having a top end and a bottom end opposite the top end;
    a horizontal rod having a first end portion and a second end portion opposite the first end portion;
    a T-connector configured to be coupled between the first end portion of the horizontal rod and a portion of the first vertical rod that is located between the top end and the bottom end of the first vertical rod, the T-connector including an opening and a flexible tab adjacent the opening to secure the first end portion of the horizontal rod in the opening of the T-connector;
    an elbow connector configured to be coupled between the second end portion of the horizontal rod and a bottom end portion of the third vertical rod, the elbow connector including an opening and a flexible tab adjacent the opening to secure the second end portion of the horizontal rod in the opening of the elbow connector; and
    at least three upper brackets, each said upper bracket configured to be coupled to a different one of the vertical rods at a top end portion of each vertical rod, each said upper bracket including an opening configured to engage a wire hang rod and/or a pole hang rod, a living hinge configured to allow the upper bracket to move from an open position to a closed position, and a locking pin configured to secure the top end portion of said vertical rod in the upper bracket while the upper bracket is in the closed position.

2. The assembly of claim 1, wherein:
the horizontal rod includes an opening adjacent the first end portion of the horizontal rod; and
the flexible tab of the T-connector is configured to engage the opening adjacent the first end portion of the horizontal rod when the first end portion of the horizontal rod is inserted into the opening of the T-connector.

3. The assembly of claim 2, wherein:
the T-connector includes a first vertical rod coupler and a second vertical rod coupler opposite the first vertical rod coupler; and
the opening of the T-connector is substantially perpendicular to the first vertical rod coupler and the second vertical rod coupler.

4. The assembly of claim 3, wherein the first vertical rod includes a first segment and a second segment, the first segment having an end portion coupled to the first vertical rod coupler of the T-connector, and the second segment having an end portion coupled to the second vertical rod coupler of the T-connector.

5. The assembly of claim 1, wherein:
the horizontal rod includes an opening adjacent the second end portion of the horizontal rod; and
the flexible tab of the elbow connector is configured to engage the opening adjacent the second end portion of the horizontal rod when the second end portion of the horizontal rod is inserted into the opening of the elbow connector.

6. The assembly of claim 1, further comprising a fourth vertical rod configured to be coupled to the horizontal shelves for providing additional support for the horizontal shelves.

7. The assembly of claim 6, wherein:
each of the horizontal shelves includes a first opening, a second opening, and a third opening;
the first openings of the horizontal shelves are alignable to form a first set of aligned openings configured to receive the first vertical rod therethrough;
the second openings of the horizontal shelves are alignable to form a second set of aligned openings configured to receive the second vertical rod therethrough; and
the third openings of the horizontal shelves are alignable to form a third set of aligned openings configured to receive the fourth vertical rod therethrough.

8. The assembly of claim 1, wherein each vertical rod includes an opening adjacent the top end portion of said vertical rod, the locking pin of the upper bracket configured to extend into the opening of the corresponding vertical rod when the upper bracket is in the closed position.

9. The assembly of claim 8, wherein the locking pin of each upper bracket is configured to help hold a load associated with the vertical rod corresponding to said upper bracket.

10. The assembly of claim 1, wherein the opening of each upper bracket includes:
a wire hang rod portion configured to engage a wire hang rod; and
a pole hang rod portion configured to engage a pole hang rod.

11. The assembly of claim 10, wherein:
the pole hang rod portion has a larger diameter than the wire hang rod portion; and/or
the wire hang rod portion is between the pole hang rod portion and the living hinge.

12. The assembly of claim 6, wherein:
the first, second, and fourth vertical rods are coupled to and supporting the horizontal shelves such that each horizontal shelf is substantially parallel with the other horizontal shelves and spaced apart from the other horizontal shelves, and such that the first, second and fourth vertical rods are substantially parallel with one another and substantially perpendicular with the horizontal shelves;
the T-connector is coupled between the first end portion of the horizontal rod and the portion of the first vertical rod between the first vertical rod's top and bottom ends;
the elbow connector is coupled between the second end portion of the horizontal rod and the bottom end portion of the third vertical rod;
the horizontal rod is supported between the T-connector and the elbow connector such that the horizontal rod extends outwardly away from the first vertical rod and extends between the first and third vertical rods and such that the horizontal rod is substantially parallel with the horizontal shelves and substantially perpendicular with the first, second, and third vertical rods; and
each of the at least three upper brackets is coupled to a different one of the vertical rods at the top end portion of said vertical rod.

* * * * *